United States Patent [19]

Lindemann

[11] 4,349,876
[45] Sep. 14, 1982

[54] CONTROL ARRANGEMENT FOR IMPROVING THE DRIVING STABILITY OF MOTOR VEHICLES WHICH ARE EQUIPPED WITH ANTI-SKID BRAKE SYSTEMS

[75] Inventor: Klaus Lindemann, Hanover, Fed. Rep. of Germany

[73] Assignee: WABCO Fahrzeugbremsen GmbH, Hanover, Fed. Rep. of Germany

[21] Appl. No.: 92,015

[22] Filed: Nov. 7, 1979

[30] Foreign Application Priority Data

Dec. 21, 1978 [DE] Fed. Rep. of Germany ....... 2855326

[51] Int. Cl.³ .............................................. B60T 8/02
[52] U.S. Cl. .................................... 364/426; 303/106
[58] Field of Search ................ 364/426; 303/103, 105, 303/106, 113

[56] References Cited
U.S. PATENT DOCUMENTS 3,998,496 12/1976 Bernabo et al. ...................... 364/426
4,033,634 7/1977 Arai et al. ............................ 303/103
4,066,230 1/1978 Nohmi et al. ........................ 364/426
4,140,353 2/1979 Riordan ............................... 303/106
4,225,195 9/1980 Weise et al. .......................... 303/106

Primary Examiner—Errol A. Krass
Attorney, Agent, or Firm—J. B. Sotak

[57] ABSTRACT

An anti-skid brake control circuit arrangement for improving the steerability of a vehicle during braking on a roadway having a different coefficient of friction on opposite sides of the vehicle, and including a plurality of sensing devices for sensing the rotational behavior of the vehicle wheels. A plurality of control circuits associated with the sensing devices for evaluating the rotational behavior of the braked wheels and for obtaining +b, −b, and λ control signals for controlling solenoid supply valves which regulate the brake pressure on the wheels so that the braking pressure is applied in pulses to a wheel running with a higher coefficient of friction. The control circuits and the solenoid supply valves are interconnected by at least two operating circuits which include timing circuits wherein the braking pressure on the wheel running with a higher coefficient of friction which has not yet been controlled is alternately held constant and then is increased in response to the control signals of the control circuit of the wheel running at a lower coefficient of friction.

14 Claims, 7 Drawing Figures

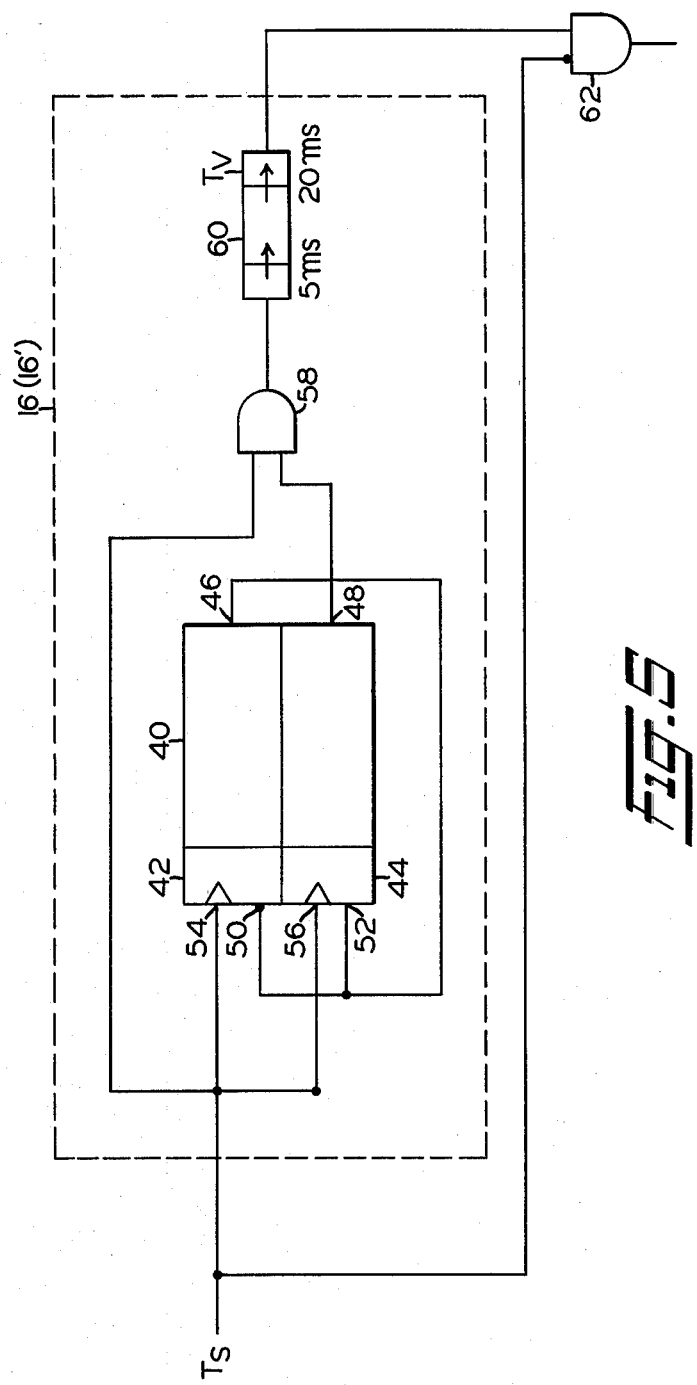

CONTROL ARRANGEMENT FOR IMPROVING THE DRIVING STABILITY OF MOTOR VEHICLES WHICH ARE EQUIPPED WITH ANTI-SKID BRAKE SYSTEMS

FIELD OF THE INVENTION

The present invention relates to an anti-skid control circuit, and more particularly to a switching circuit arrangement for improving the steering and stability of the travel of a motor vehicle which is equipped with an anti-skid brake control system.

BACKGROUND OF THE INVENTION

It is generally understood that any anti-skid vehicle brake system must meet the following three primary conditions, among others: provide lockup-free braking, exhibit minimal braking distance, and avoid yawing moments and steering moments during braking.

In the anti-skid control system as shown and disclosed in West German Preliminary Published Patent Application No. DE-OS 24 37 066, there is provided a device which is assigned to each brakable wheel of an axle for sensing the dynamic behavior of the wheel. The output signals from the devices are fed to evaluation circuits, which produce the output signals for controlling the braking pressure to the brakes of the left and right wheels. The evaluation circuits are interconnected to each other in such a way that, in the case of different friction coefficients ($\mu$-values) for the left and right wheels of an axle (split friction coefficients), the braking pressure of the wheel running at the higher friction coefficient (high wheel) is controlled by the output signals of the evaluation circuit of the wheel running with the lower friction coefficient (low wheel). The evaluation circuits are connected to pulse devices for gradual buildup of pressure. The pulse devices interconnected to the evaluation circuits in such a way that in each case a pulse device can be switched on by the output signals of the evaluation circuit of the other wheel or by the supply valve control signal of the other wheel. For example, if the indicating signals show that only one of the wheels has a tendency to lock up, or if only one supply valve of the axis is energized, the braking pressure on the other, not-yet-controlled, wheel is built up in pulses. The pulse device then produces a fixed sequence of pulses independently of the course of the control cycles of the low wheel.

Now it can happen that at certain points in time the $\mu$-valve employed for the low wheel becomes lower and that the slippage on the controlling wheel thus becomes smaller but that the high wheel that is cocontrolled undergoes a change to higher $\mu$ and $\lambda$-values. In previous anti-skid protection equipment there is the danger of sudden instability of travel due to phase-opposed changes in the braking pressure which can cause a great steering moment on the wheels of the steering axle. Thus, there is a shock on the steering, since at the time the yawing moment increases sharply (see FIGS. 3A and 3B).

OBJECTS OF THE INVENTION

An object of the present invention therefore consists in designing a unique control circuit for an anti-skid brake system in such a way that the stability of travel with split friction coefficients is improved.

Another object in accordance with the invention is to devise an improved anti-skid brake control switching circuit wherein the pulsed pressure buildup and the resulting increase in braking pressure on the cocontrolled high wheel takes place adaptively and in-phase with the build-up of braking pressure on the controlled wheel (low wheel) so that steering moments and possible yawing moments are built up very slowly, in phase, and without jerks even in the case of extreme split friction coefficients so that stability of travel is maintained.

DESCRIPTION OF THE DRAWINGS

The invention will now be elucidated in detail using the attached drawing, in which one embodiment is represented, in which:

FIG. 5 is a schematic diagram of a timing element employed in the circuit in accordance with FIG. 1.

DETAILED DESCRIPTION OF THE INVENTION

Figure 1:
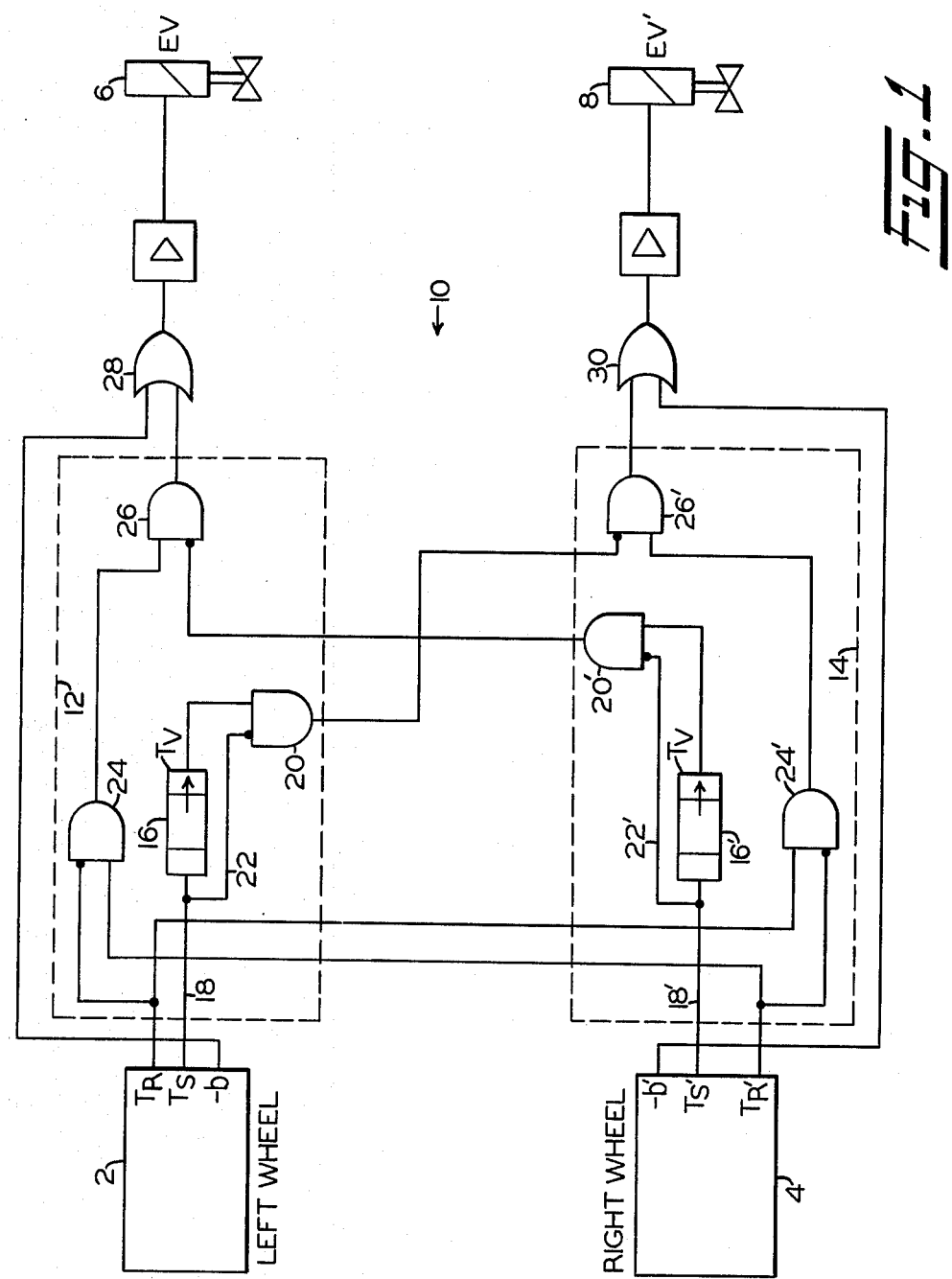
FIG. 1 illustrates a preferred embodiment of a switching circuit arrangement in accordance with the invention.

Referring now to the drawings, and, in particular, to FIG. 1, there is shown a switching circuit arrangement which is generally characterized by numeral 10. The switching circuit 10 is connected to the control circuits 2 and 4 which, for example, may be responsive to the left and right wheel of an axle for controlling the brake control solenoid supply valves 6 and 8 of these respective wheels. The circuit 10 also includes two symmetrically designed operating circuits 12 and 14 respectively assigned to the individual control circuits and logically interconnected to each other.

It will be appreciated that because of the symmetrical design, and for the sake of a better overview and for reasons of simplicity, any equivalent components or counterparts will be given the same reference numbers; however, for the purposes of differentiation, the components of operating circuit 14 are illustrated with a prime-mark.

The two operating circuits 12 and 14 include a respective timing element 16 and 16' each with a prespecified cut-off time delay $T_V$. The timing elements 16 and 16' are controlled via lines 18 and 18' by respective signals $T_S$ and $T_S'$ which represent the initially steep input phase of the wheel which is running on a lower friction coefficient ($\mu$-value), and designated the low wheel. The signal $T_S$ or $T_S'$ is produced by the respective control circuit 2 or 4, each of which also produces another control time signal $T_R$ or $T_R'$ which is developed at the beginning of control and continues to the end of control.

The output $T_V$ of the timing element 16 and 16' is applied to the one or noninverted input of a respective two-input AND-gate 20 and 20'. The signal $T_S$ or $T_S'$ is fed via a line 22 and 22' to the other or inverted input of the respective AND-gate 20 and 20'. The circuits 12 and 14 also include a respective two-input AND-gate 24 or 24'. The control time signal $T_R$ of the control circuit 2 is fed to the inverted input of the AND-gate 24 and is also fed to the noninverted input of AND-gate 24'. The control time signal $T_R'$ of the control circuit 4 and is fed to the inverted input of AND-gate 24' and is fed to the noninverting input of AND-gate 24. Thus, in each case the input of the AND-gate 24 or 24' is inverted for its "own" $T_R$ or $T_R'$ control signal. The output signal of the AND-gate 24 is connected to one input of in a further two-input AND-gate 26 while the output signal of the AND-gate 24' is connected to one input of a further two-input AND-gate 26'. The output signal of AND-gate 20 is connected to the other input of the AND-gate 26' while the output signal of AND-gate 20' is connected to the other input of AND-gate 26. The other inputs of AND-gates 26 and 26' received from the outputs of the AND-gate 20' and 20 of the respective circuits 14 and 12 are in each case inverted.

The output signal of the AND-gate 26 is combined with a -b control signal or with a comparable control signal produced by the control circuit 2 to provide the inputs to an OR-gate 28 while the output signal of the AND-gate 26' is combined with a -b signal or with another control signal produced by the control circuit to provide the inputs to an OR-gate. The output signal of each of the OR-gates 28 and 30 is appropriately amplified and is connected to an associated supply valve 6 and 8.

Figure 2:
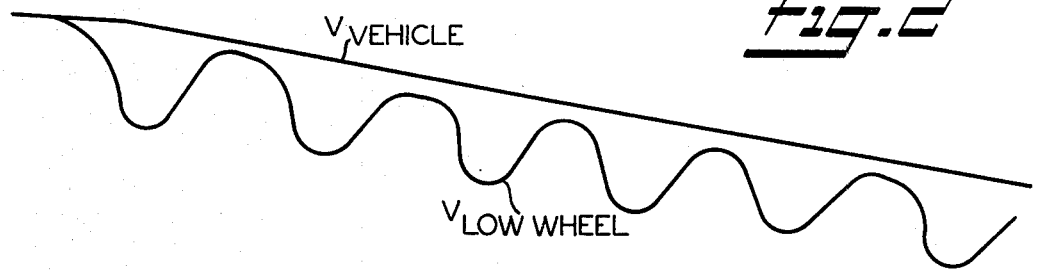
FIG. 2 is a schematic graphic representation of the course of the velocity of the vehicle and of the low wheel during braking.
Figure 3A:
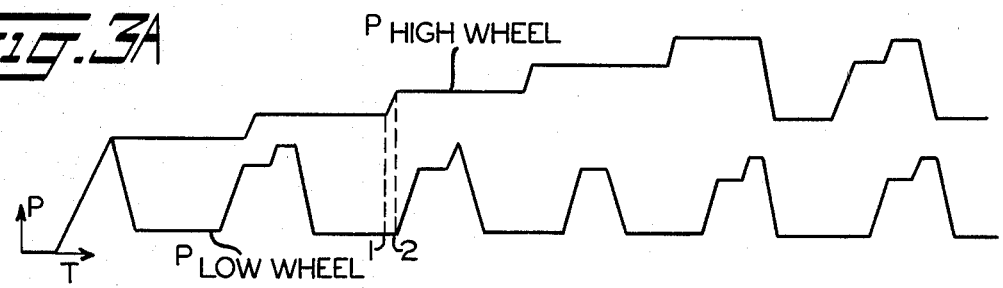
FIGS. 3A and 3B illustrate schematically, the pressure build-up curves of the low and the high wheels and the course of the low and high wheels on the associated friction coefficient/slippage curves in the case of the circuit in accordance with West German Preliminary Published Patent Application No. DE-OS 24 37 066 mentioned above.
Figure 3B:
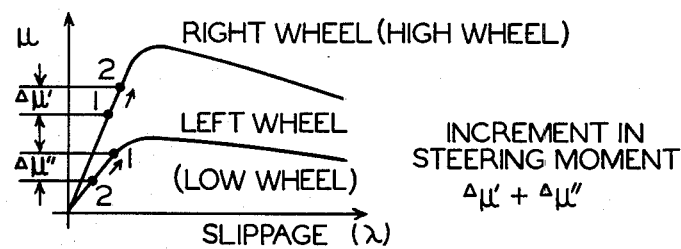
Figure 4A:
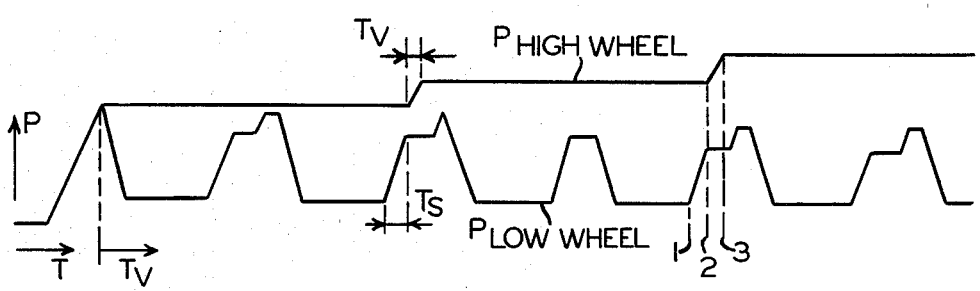
FIGS. 4A and 4B illustrate schematically, the pressure build-up curves of the low and high wheels and the course of the low and high wheels on the associated friction value/slippage curves in the case of the switching circuit arrangement of FIG. 1.

In describing the operation of the switching circuit in accordance with FIG. 1, it is highly advantageous to make reference to the curves shown in FIGS. 2 to 4. Let us now assume that the left wheel associated with the operating circuit 12 is running at the lower friction value (low wheel). During the braking of the vehicle, the vehicle and the low wheel will follow approximately the velocity curves as shown in FIG. 2. The signal $T_R$ is first produced by the control circuit 2 which is associated with the assumed low wheel. This effectively causes a high signal to appear at the output of the AND-gate 24' of the circuit 14 for the righthand wheel running at the higher friction coefficient (high wheel) since $T_R$ signal is high and because the $T_R'$ signal which is low is inverted. Further, since the output of the AND-gate 20 remains low until the appearance of the $T_S$ signal, the AND condition for the gate 26' is met, so that the supply valve 8 for the high wheel is energized by the amplified signal of OR-gate 30. Thus, the pressure is held constant as shown by the high wheel pressure curve of FIG. 4A until the disappearance of the $T_S$-signal which occurs every second control cycle. The exact construction of a timing element for accomplishing such a timing function is shown by the circuit 16, 16' of FIG. 5, which will be discussed in greater detail hereinafter.

After the disappearance of the signal $T_S$ which occurs every second control cycle, a high signal is developed on the output of the timing element 16 for the duration of the cutoff delay $T_V$ or 20 msec, for example. For this period of time, the AND-gate 20 produces a high output signal which enables the AND-gate 26'. Thus, the supply valve 8 of the high wheel is deenergized for the time $T_V$ braking, and the pressure is applied to the high wheel.

After timing-out of the timing element 16 and disappearance of the $T_V$ signal, the disabling of the AND-gate 26' is again withdrawn and the supply valve 8 is again controlled to hold pressure as shown by the high wheel pressure curve of FIG. 4A.

This process is repeated over the entire number of control cycles of the low wheel as long as no control occurs on its own braking pressure by the high wheel itself.

Figure 4B:
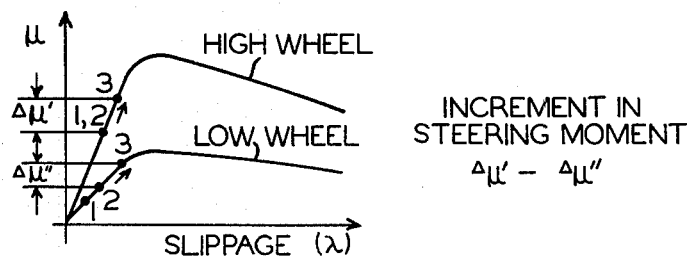

In viewing FIG. 4B, it will be seen that there is illustrated the wheel plots of the $\mu/\lambda$-curves and the corresponding steering moments. When viewed in conjunction with FIG. 4A, with consideration of the sequence of points passed through, 1, 2, and 3, it is clearly seen that the increase in the utilization of the $\mu$-value utilized on the two wheels takes place in phase, which means that the increase in steering moment is proportional to the difference of the changes in friction coefficient ($\Delta\mu$) arising in the high wheel and the low wheel.

In an anti-skid system of the type shown and disclosed in the abovementioned application, DE-OS 24 37 066 there is a steering problem because of the fixed pulse sequence, and a result is obtained like that shown by the curves of FIGS. 3A and 3B. Thus, this results in a disadvantageous increase in the steering moment because of the sequence of points passed through, namely, points 1 and 2, see also the arrows in the $\mu/\lambda$-curves. In such a system, the increase in steering moment is proportional to the sum of the changes on the friction coefficients ($\alpha\mu$) arising in the two wheels.

The timing circuit in accordance with FIG. 5, which shows in greater detail component 16, 16' used in FIG. 1. As shown, the timing circuit includes a flip-flop 40 with two input circuits 42 and 44 and two outputs 46 and 48. Each input circuit 42 or 44 includes two conditioning inputs 50 and 52 and two dynamic clock inputs 54 and 56. The conditioning input 50 of input circuit 42 is inverted. The output 46 is fed back to the two inputs 50 and 52. The output 48 is logically combined with the signal $T_S$ in a two-input AND-gate 58. The output of AND-gate 58 controls a timing element 60 which has a switch-on circuit and a cut-off circuit. The output signal of the timing element 60, as already described in connection with the circuit of FIG. 1, is combined with the $T_S$ signal in an AND-gate 62, which corresponds to the AND-gates 20 and 20' in the circuit of FIG. 1. The $T_S$ signals are fed to the clock inputs 54 and 56.

The timing circuit of FIG. 5 operates in the following manner. In the initial state, the output 46 has low potential and the output 48 has high potential. However, because of inversion of the low potential appearing on terminal 46, a high signal is present at the input 50, but a low signal is maintained at the input 52. Now when the rising or front edge of the signal $T_S$ appears a shift occurs and a high signal appears at the output 46 and a low signal at the output 48.

The high signal at output 46 causes the preparatory input 50 of the input circuit 42 to go to a low condition and causes the preparatory input 52 of the input circuit 44 to go to a high condition.

As soon as the $T_S$ signal of the next control cycle appears after expiration of a previous $T_S$ signal, a high signal appears at the output 48 which enables the AND-gate 58. That is, the AND-gate 58 is activated by the $T_S$ signal on one input and the high signal from output 48 on the other input so that the timing element 60 is initiated.

The low signal at the output 46 of the flip-flop 40 causes the conditioning input 52 to again receive a low signal and the conditioning input 50 to again receive a high signal.

The AND-gate 58 remains enabled until the expiration of the $T_S$ signal. After expiration of the $T_S$ signal and timing-out of the input delay (e.g. 5 ms). The output of the timing element 60, for the period $T_V$ (e.g. 20 ms) of the switch-off delay, is at a high level. With the signal on one input of the AND-gate 62, the AND-gate 62 is activated or enabled by the disappearance of the $T_S$ signal from the other inverting input.

The output of the AND-gate 62, which corresponds to the outputs of AND-gates 20 and 20' of the circuit of FIG. 1, interrupts the activation of the supply valve on the cocontrolled nonslipping or high wheel for the introduction of braking pressure, as was previously described above in connection with the operation of the switching circuit arrangement of FIG. 1.

The switch-on delay at the timing element 60 is used to ensure definite ratios when the signal $T_S$ appears.

As an alternative to the above-described operation of the switching circuit arrangement of FIG. 1, it is understood that certain changes and provisions can also be made for the following measures:

1. Pulsing or introduction of braking pressure on the high wheel in every control cycle or in every n-th control cycle, where n=2, 3, 4, ...

2. The pulsing phase or the introduction of braking pressure on the high wheel can begin not after the full expiration of the $T_S$ signal, but rather immediately after the braking-force hysteresis is passed through, for example, as early as after expiration of half the time period of the $T_S$ signal.

3. The pulsing phase or the introduction of braking pressure on the high wheel begins in dependence on a predetermined wheel deceleration of the low wheel, for example $-b=0.8$ g.

4. The beginning of pulsing of the individual pulsing phase may be dependent on a part of the sum of the pressure introduction times in the input phases ($T_S$+pulsing time) of the individual last control cycle of the controlling wheel (low wheel).

I claim:

1. A switching circuit arrangement for improving the stability of travel during the braking of a vehicle equipped with an anti-skid brake system on a roadway having different coefficients of friction on the left and right side of the vehicle comprising, sensing devices for sensing the rotational behavior of the vehicle wheels, control circuits associated with the wheels for evaluating the rotational behavior of the wheels and for obtaining deceleration, acceleration, and slip control signals which control the condition of solenoid supply valves for regulating the brake pressure on the wheels so that the braking pressure is applied in pulsating fashion to a wheel running with a higher coefficient of friction, and at least two interrelated operating circuits electrically interconnected between said control circuits and said solenoid supply valves, said interrelated operating circuits including timing means for controlling the braking pressure on the wheel running with the higher coefficient of friction so that the brake pressure is held constant for a period of time and then is increased in response to the control signals of said control circuit of the wheel running with the lower coefficient of friction which is being controlled and at times when the wheel with the lower coefficient of friction is being braked.

2. The switching circuit arrangement as defined in claim 1, wherein said control circuit of the wheel running with the higher coefficient of friction includes logical elements which allow the increase in braking pressure on the wheel with the higher coefficient of friction in a brake-pressure application phase.

3. The switching circuit arrangement as defined in claim 1, wherein said timing means causes the increase in the braking pressure to the wheel running with the higher coefficient of friction after the expiration of a predetermined time.

4. The switching circuit arrangement as defined in claim 1, wherein said timing means causes the increase in the braking pressure to the wheel running with the higher coefficient of friction after the passage of braking-force hysteresis on the wheel running with the lower coefficient of friction.

5. The switching circuit arrangement as defined in claim 1, wherein said timing means causes the increase in braking pressure to the wheel running with the higher coefficient of friction at a certain wheel deceleration of the wheel running with the lower coefficient of friction.

6. The switching circuit arrangement as defined in claim 1, wherein said timing means causes the increase in braking pressure to the wheel running with the higher coefficient of friction said increase taking place on every successive control cycle of the wheel running with the lower coefficient of friction.

7. The switching circuit arrangement as defined in claim 1, wherein said timing means is controlled by a signal which is developed during an initially steep input phase on the wheel running with the lower coefficient of friction so that after the disappearance of said signal said solenoid supply valve which is associated with the wheel running with the higher coefficient of friction is activated over a predetermined period of time for increasing the braking pressure to the wheel running with the higher coefficient of friction.

8. The switching circuit arrangement as defined in claim 7, wherein said signal is applied to the input of said timing means for activating said timing means which produces an output signal after a predetermined delay, the output signal of said timing means is applied to a noninverting input of an AND-gate of one of said operating circuits, for producing a high signal, the high signal of said AND-gate of said one of said operating circuits is applied to an inverting input of an AND-gate of another of said operating circuits for disabling said AND-gate of said another of said operating circuits, the disablement causes the deenergization of said solenoid supply valve for the wheel running with the higher coefficient of friction.

9. The switching circuit arrangement as defined in claim 8, wherein the output of said AND-gate of said another of said operating circuits is connected by an OR-gate to the solenoid supply valve of the wheel running with the higher coefficient of friction.

10. The switching circuit arrangement as defined in claim 1, wherein said timing means includes a cut-off delay.

11. The switching circuit arrangement as defined in claim 1, wherein said timing means includes a flip-flop having two-input circuits, said input circuits having a pair of dynamic clock inputs and a pair of conditioning inputs and a pair of outputs, one of said outputs is connected to said pair of said conditioning inputs, the other of said outputs connected to one input of an AND-gate which has its output connected to the input of a timing circuit, and an input signal connected to said dynamic clock inputs and another input of said AND-gate so that said timing circuit is activated and after a predetermined period of time an output signal is produced.

12. The switching circuit arrangement as defined in claim 11, wherein said timing means includes a cut-off delay circuit.

13. The switching circuit arrangement as defined in claim 12, wherein said timing means includes a switch-on delay circuit.

14. The switching circuit arrangement as defined in claim 1, wherein each of said operating circuits includes a timing element connected to a first signal source, a first AND-gate connected to said first signal source and connected to said timing element, a second AND-gate connected to a pair of second signal sources, a third AND-gate connected to said second AND-gate and connected to the first AND-gate of the other operating circuit, an OR-gate connected to a deceleration signal source and connected to said third AND-gate and a solenoid supply valve connected to said OR-gate.

* * * * *